Patented Nov. 17, 1942

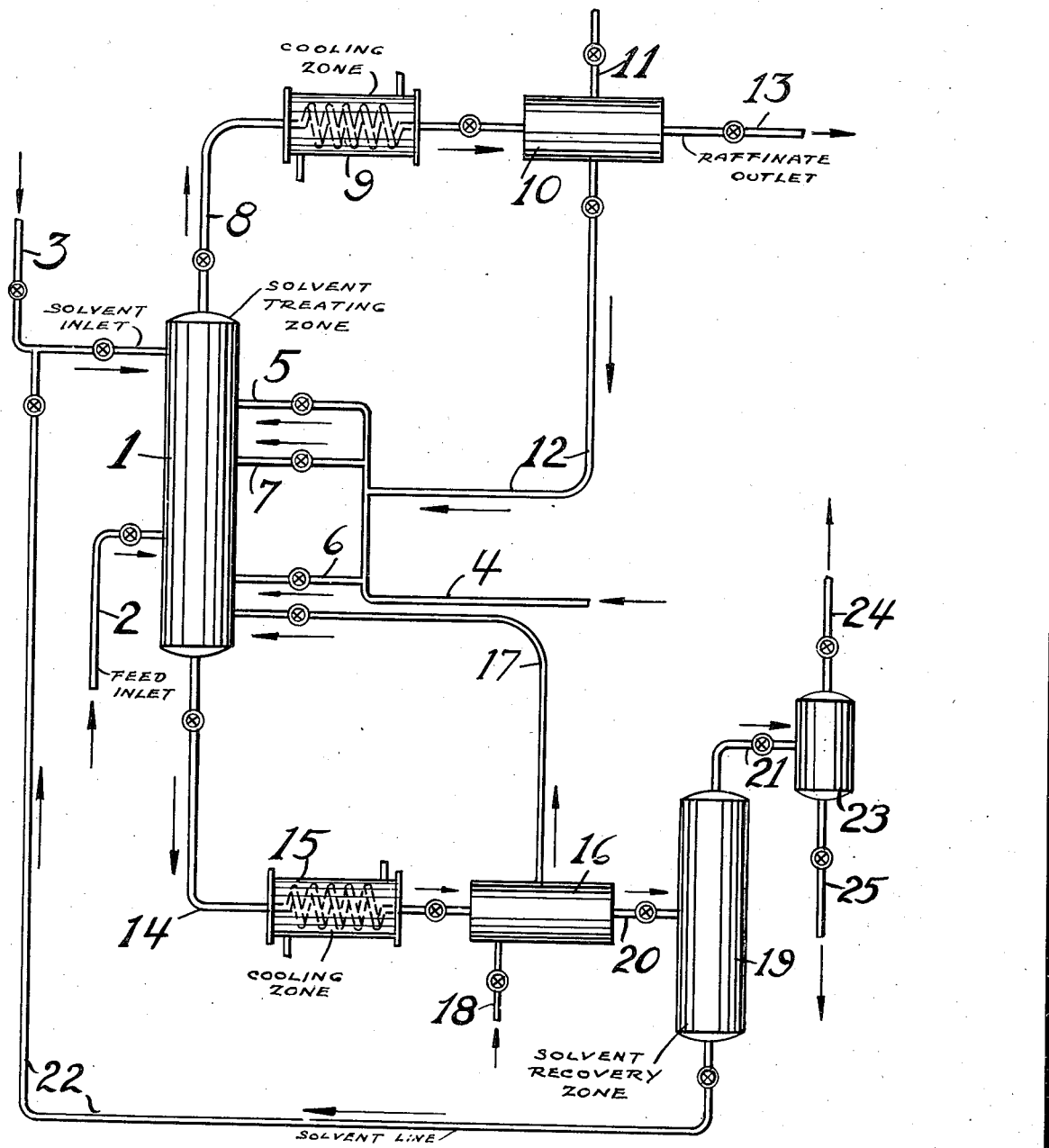

2,302,303

UNITED STATES PATENT OFFICE 2,302,303

SOLVENT EXTRACTION OF NAPHTHAS

Gordon W. Duncan, Scotch Plains, N. J., assignor to Standard Oil Development Company, a corporation of Delaware Application April 26, 1941, Serial No. 390,446

5 Claims. (Cl. 196—13)

The present invention is concerned with the separation of oils into their relatively more aromatic constituents and into their relatively more paraffinic constituents. The invention is more particularly concerned with the treatment of petroleum oils, especially petroleum oils boiling in the naphtha, kerosene, and gas oil range, with a solvent selected from the class of solvents which have been found to give particularly desirable results. The solvents of the present invention are selected from the class of hydroxy polyamines characterized by having an ethylene group between the respective nitrogen atoms. The present application is a continuation-in-part of my application No. 286,339, filed July 25, 1939, entitled "Solvent extraction of naphthas."

It is known in the art to treat oils, particularly petroleum oils, with various selective solvents in order to segregate the oils into their relatively more paraffinic or hydrogen rich constituents and into their relatively more aromatic or hydrogen poor constituents. In these processes, solvents of the class which have a preferential selectivity for the more aromatic type compounds are usually employed, as for example, phenol, furfural, sulfur dioxide, cresol, nitrobenzene, aniline, beta beta dichlor diethyl ether, and the like. Solvent mixtures of these solvents are employed as well as other substances having the ability to modify the selectivity and solvent power of the particular solvent or solvent mixture. Substances of this type are water, liquefied normally gaseous hydrocarbons such as propane and butane, as well as alcohols and glycols. The oil and the solvent, or solvent mixture, employed are contacted by various methods, as for example, by a batch or by a semi-batch operation. However, the usual method employed is a countercurrent tower treating operation. In this operation, the lighter phase, usually the oil, is introduced at the lower or middle section of a countercurrent treating tower. The heavier phase, usually the solvent, is introduced into the upper part of the countercurrent solvent treating tower. The respective phases flow countercurrently under conditions in which complete contact between the respective phases is secured. This is usually accomplished by suitable distributing and contacting means. Temperature and pressure conditions are maintained on the system adapted to secure the formation of a solvent-rich or extract phase and the formation of a relatively solvent-poor, or raffinate phase. The respective phases are removed from the tower and the solvent separated by any suitable means, such as by distillation, washing, and the like. For commercial solvent treating processes it has been difficult to find a solvent which is entirely suitable in all respects. An ideal solvent is one which will make a clear separation between the aromatic and the paraffinic constituents of the oil and which will also extract substantially the entire quantity of aromatic constituents present. It is also desirable to have the solvent exhibit this preferential selectivity at relatively low temperatures in order to reduce operating difficulties and expenses. Furthermore, it is desirable that the selective solvent be readily and economically removable from the extract and raffinate phases. The selective solvent is usually separated from the raffinate and extract phases by re-extracting said phases with a secondary solvent or by distillation. If distillation be employed to separate the solvent from the oil it is necessary that a sufficient difference exist with respect to the various boiling points. Solvent recovery from the respective phases, particularly from the extract phase, will be greatly facilitated provided the particular solvent employed is completely miscible with the relatively more aromatic fraction at operating temperature, which temperature should not be excessively above atmospheric temperatures due to heat economies, and providing the solvent tends toward immiscibility with the extract at temperature not substantially below atmospheric temperatures.

I have now discovered a class of solvents which possess these characteristics and which are therefore particularly desirable in the commercial solvent treatment of petroleum oils. The solvents of my invention are selected from the class of substances known as hydroxy polyamines, characterized by having an ethylene group between the respective nitrogen atoms, and their derivatives. Solvents of this class are, for example, hydroxyethyl ethylene di-amine having a chemical structure as follows:

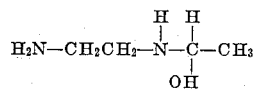

The process of my invention may be readily understood by reference to the attached drawing illustrating one modification of the same. For the purpose of illustration, it is assumed that the solvent employed is hydroxy ethyl ethylene di-amine and that the oil being treated is a petroleum naphtha boiling in the range below about 400° F. Petroleum feed oil is introduced into countercurrent solvent treating tower 1 by means of feed line 2. The feed oil flows upwardly through tower 1 and contacts downflowing solvent which is introduced to the tower by means of solvent feed line 3. Water is introduced into the countercurrent treating tower 1 at a plurality of points by means of lines 4, 5, 6 and 7. Temperature and pressure conditions in tower 1 are adapted to secure the formation of a raffinate phase and a solvent extract phase. The raffinate phase is withdrawn from tower 1 by means of line 8, cooled, if desired, in cooler 9 and introduced into separation zone 10. The cooling will, in general, be sufficient to substantially completely separate the solvent from the paraffinic type oil. However, under certain conditions, it may be desirable to add water to separation zone 10 by means of line 11. The added water will substantially completely remove the remaining solvent and form a water-solvent phase. The water-solvent phase is withdrawn from separation zone 10 by means of line 12, while the solvent-free raffinate is withdrawn by means of line 13. The solvent extract phase is withdrawn from solvent treating tower 1 by means of line 14, cooled, in cooler 15, and introduced into separation zone 16. Due to the marked change in solubility of aromatics in hydroxy ethyl ethylene di-amine with a change in temperature, separation between the solvent and the highly aromatic oil occurs in separation zone 16. The precipitated oil phase may be returned to solvent treating tower 1 by means of line 17. Under certain conditions, it may be desirable to add water into separation zone 16 by means of line 18. The extract phase containing solvent is introduced into distillation zone 19 by means of line 20. The highly aromatic petroleum oil is removed overhead from distillation zone 19 by means of line 21 while the solvent is withdrawn by means of line 22 and recycled to line 3. The overhead from zone 19 comprising oil and steam is passed into separation zone 23. The extract product is removed from separation zone 23 by means of line 24, while the water layer is removed by means of line 25 and recycled to lines 4, 10, and 18.

The process of the present invention may be widely varied. The respective zones may comprise any suitable number and arrangement of units. Desirable solvents in the treatment of petroleum oils boiling in the range below about 420° F. have been found to be the hydroxy ethyl di-amines, particularly the high boiling monohydroxy ethyl ethylene di-amines.

Hydroxy ethyl ethylene di-amine is completely miscible with 90% benzol at 115° F. and substantially completely immiscible with a highly paraffinic fraction boiling in the range from about 250° F. to 400° F. This solvent at room temperatures precipitates a substantial amount of benzol. Thus, any desired solubility of naphtha may be obtained by raising the temperature while the use of reflux by cooling makes it possible to produce practically 100% aromatic extracts. Hydroxyethyl ethylene di-amine is very soluble in water and a benzol-amine solution and immediately upon the addition of water, will form a benzol phase substantially free of solvent and a water-solvent phase. Hydroxy ethyl ethylene di-amine has a boiling point of about 470° F. and may, thus, be readily recovered from petroleum oils boiling in the gasoline range by distillation.

The amount of solvent used per volume of oil treated will, in general, depend upon the character of the oil being treated, the conditions of the operation, as well as upon the quality and yields desired. In general, it is preferred to employ from about 0.5 to 4 volumes of solvent per volume of oil. Temperature and pressure conditions are likewise adjusted to secure an optimum operation and are a function, to a large extent, of the above enumerated factors. In general, it is preferred to employ atmospheric pressure and to maintain the temperature in the countercurrent treating zone in the range from about 100° F. to about 125° F. It has been found that at these temperatures, the solvent dissolves a maximum amount of the aromatic constituents and a minimum quantity of the paraffin constituents. The amount of water added likewise is adjusted to secure an optimum separation between the aromatic type compounds and the paraffinic type compounds. In general, it is desirable to add from about 5 to about 10% of water based upon the volume of solvent and to add the water at a plurality of points in the countercurrent treating zone. The extent to which the solvent extract phase is cooled will be determined to a large extent by the quality and yield desired. For example, if it be desired to produce an extract comprising substantially 100% aromatic type constituents, it is preferable to cool the solvent extract phase to a temperature of about 70° F.

Although the solvent may be removed from the respective phases by distillation, it is preferred to remove the same by washing with water. It has been found that the solvent will be readily removed from the respective phases by adding from about 75% to about 1.25% of water, based upon the volume of solvent present.

In order to further illustrate the invention, the following example is given which should not be construed as limiting the same in any manner whatsoever:

EXAMPLE

A mixture of 20% toluene and 80% iso-octane was treated with 100% of hydroxy ethyl ethylene di-amine. The results secured were as follows:

*100% batch treats on mixture of 20% toluene-80% iso-octane*

| Solvent | Hydroxy ethyl ethylene di-amine |
|---|---|
| Temperature °F | 172 |
| Extract yield, calculated from refractive index | 7.1 |
| Aromatics in extract percent | 71 |

From the above it is apparent that hydroxy ethyl ethylene di-amine is extremely selective and very desirable. The operating temperature of about 125° F. is in the most desirable range for extracting petroleum oils boiling in the motor fuel boiling range.

What I claim as new and wish to protect by Letters Patent is:

1. Process for the separation of petroleum oils into their relatively more aromatic constituents and into their relatively more paraffinic constituents, comprising extracting said oil with a solvent comprising hydroxy ethyl ethylene di-amine under conditions to form a solvent extract and a raffinate phase, separating the respective phases and removing the solvent therefrom.

2. Process for the separation of petroleum oils boiling below about 400° F. into their relatively more aromatic constituents and into their relatively more paraffinic constituents comprising extracting said oil in the liquid phase with a solvent comprising hydroxy ethyl ethylene di-amine under conditions to form a solvent extract phase and a raffinate phase, separating the respective phases and removing the solvent therefrom.

3. Process in accordance with claim 2 in which said solvent is removed from the respective phases by washing with water.

4. Process for the separation of petroleum oils boiling below about 400° F. into their relatively more aromatic and into their relatively more paraffinic constituents, comprising extracting said oil with a solvent comprising hydroxy ethyl ethylene di-amine under temperature and pressure conditions adapted to secure the formation of a solvent extract phase and a raffinate phase, separating the respective phases and cooling the same to atmospheric temperature, separating a substantial amount of the selective solvent from the oil phase and removing the remaining solvent from the oil phase by washing with approximately 100% of water, based upon the amount of solvent remaining in the oil phase.

5. Process in accordance with claim 4 in which said solvent is contacted with the oil at a temperature of about 115° F.

GORDON W. DUNCAN.